United States Patent
Brockway et al.

(10) Patent No.: US 8,056,014 B2
(45) Date of Patent: Nov. 8, 2011

(54) WEB PORTAL PAGE INTERACTIVE USER INTERFACES WITH MAXIMUM ACCESSIBILITY TO USER SELECTED PORTLETS

(75) Inventors: Brandon J. Brockway, Leander, TX (US); James McArdle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1435 days.

(21) Appl. No.: 11/538,502

(22) Filed: Oct. 4, 2006

(65) Prior Publication Data

US 2008/0092039 A1 Apr. 17, 2008

(51) Int. Cl.
*G06F 17/00* (2006.01)

(52) U.S. Cl. ........ 715/788; 715/234; 715/760; 715/796; 715/800; 715/802

(58) Field of Classification Search .................. 715/234, 715/760, 788, 796, 798–802
See application file for complete search history.

(56) References Cited

U.S. PATENT DOCUMENTS

| | | | | |
|---|---|---|---|---|
| 5,684,969 A * | 11/1997 | Ishida | ............ | 715/800 |
| 5,699,535 A * | 12/1997 | Amro | ............ | 715/800 |
| 5,771,042 A * | 6/1998 | Santos-Gomez | ............ | 715/800 |
| 6,008,809 A * | 12/1999 | Brooks | ............ | 715/792 |
| 6,075,537 A * | 6/2000 | Adapathya et al. | ............ | 715/760 |
| 6,396,521 B1 * | 5/2002 | Lai et al. | ............ | 715/800 |
| 6,918,090 B2 * | 7/2005 | Hesmer et al. | ............ | 715/760 |
| 6,922,815 B2 * | 7/2005 | Rosen | ............ | 715/782 |
| 7,013,432 B2 * | 3/2006 | Taylor et al. | ............ | 715/788 |
| 7,047,502 B2 * | 5/2006 | Petropoulos et al. | ......... | 715/781 |
| 7,062,723 B2 * | 6/2006 | Smith et al. | ............ | 715/860 |
| 7,082,577 B1 * | 7/2006 | Brosnahan | ............ | 715/860 |
| 7,177,948 B1 * | 2/2007 | Kraft et al. | ............ | 709/246 |
| 7,376,900 B2 * | 5/2008 | Guido et al. | ............ | 715/742 |
| 7,434,177 B1 * | 10/2008 | Ording et al. | ............ | 715/862 |
| 7,487,443 B2 * | 2/2009 | Guido et al. | ............ | 715/246 |
| 7,536,650 B1 * | 5/2009 | Robertson et al. | ............ | 715/767 |
| 7,543,234 B2 * | 6/2009 | Daniels et al. | ............ | 715/742 |
| 7,546,547 B2 * | 6/2009 | Carey et al. | ............ | 715/788 |
| 7,614,018 B1 * | 11/2009 | Ohazama et al. | ............ | 715/862 |
| 7,689,525 B2 * | 3/2010 | Drucker et al. | ............ | 706/45 |
| 7,735,018 B2 * | 6/2010 | Bakhash | ............ | 715/782 |
| 2001/0043235 A1 * | 11/2001 | Best et al. | ............ | 345/781 |
| 2003/0076363 A1 * | 4/2003 | Murphy | ............ | 345/800 |
| 2004/0003351 A1 * | 1/2004 | Sommerer et al. | ............ | 715/517 |
| 2005/0022136 A1 * | 1/2005 | Hatscher et al. | ............ | 715/798 |
| 2005/0086609 A1 * | 4/2005 | Cohen | ............ | 715/767 |
| 2005/0188329 A1 * | 8/2005 | Cutler et al. | ............ | 715/804 |
| 2005/0235220 A1 * | 10/2005 | Duperrouzel et al. | ........ | 715/788 |
| 2005/0240873 A1 * | 10/2005 | Czerwinski et al. | ............ | 715/740 |
| 2005/0268248 A1 * | 12/2005 | Boerner et al. | ............ | 715/788 |
| 2005/0283524 A1 * | 12/2005 | Kim | ............ | 709/217 |
| 2005/0283739 A1 * | 12/2005 | Mohr et al. | ............ | 715/800 |
| 2006/0026557 A1 * | 2/2006 | Petri | ............ | 717/106 |
| 2006/0064647 A1 * | 3/2006 | Tapuska et al. | ............ | 715/800 |

(Continued)

*Primary Examiner* — Stephen Hong
*Assistant Examiner* — I-Chan Yang
(74) *Attorney, Agent, or Firm* — J. B. Kraft; Jill A. Poimboeuf (57) ABSTRACT

A Web portal page at a Web display station having a plurality of portlet sections, each portlet including text and at least one active hyperlink to another Web page. An implementation enabling a user to enter one of the displayed portlet sections, enlarging the area of the entered one portlet section, and reducing the areas of a plurality of the other portlet sections so that at least one hyperlink in each of the other portlet sections of reduced area remains active.

20 Claims, 7 Drawing Sheets

U.S. PATENT DOCUMENTS

2006/0224997 A1* 10/2006 Wong et al. .................. 715/838
2006/0248471 A1* 11/2006 Lindsay et al. ............... 715/800
2009/0307188 A1* 12/2009 Oldham et al. .................. 707/3
2010/0086022 A1* 4/2010 Hunleth et al. .......... 375/240.01

* cited by examiner

WEB PORTAL PAGE INTERACTIVE USER INTERFACES WITH MAXIMUM ACCESSIBILITY TO USER SELECTED PORTLETS

TECHNICAL FIELD

The present invention relates to computer managed communication networks, such as the World Wide Web (Web) and, particularly, to interactive computer controlled display interfaces for displaying Web portal pages with maximum user accessibility to the Web sites provided through the Web Portal site.

BACKGROUND OF THE INVENTION

The past generation has been marked by a technological revolution driven by the convergence of the data processing industry with the consumer electronics industry. The effect has, in turn, driven technologies that have been known and available but relatively quiescent over the years. A major one of these technologies is the Internet related distribution of documents, media and programs. The convergence of the electronic entertainment and consumer industries with data processing exponentially accelerated the demand for wide ranging communications distribution channels and the Web or Internet, which had quietly existed for over a generation as a loose academic and government data distribution facility, reached "critical mass" and commenced a period of phenomenal expansion. With this expansion, businesses and consumers have direct access to all matter of documents, media and computer programs.

In addition, Hypertext Markup Language (HTML), which had been the documentation language of the Internet or Web for years, offered direct links between pages and other documentation on the Web and a variety of related data sources that were, at first, text and then evolved into media, i.e. "hypermedia". This even further exploded the use of the Internet or Web. It was now possible for the Web browser or wanderer to spend literally hours going through document after document and accompanying media events in often less than productive excursions through the Web. These excursions strained the user's time and resources. A significant source of this drain is in the Web page, the basic document page of the Web. Although many Web pages are professionally designed and, thus, relatively efficient to use, there are still a great many Web pages that are very cumbersome to access and to use.

Among the attempts by Internet or Web (used interchangeably) industries to solve these problems have been the development of Web portals. These are Web sites that provide specialized capabilities to their users. During the recent era when Netscape Web browsers were prominent on the Web, the Web portals were often starting or launching points for the browser onto the Web. Also, Yahoo! provided some of the early Web portals. Governments and governmental agencies used Web portals. Web portals for industries and marketplaces have become very widely used. A generalized description of Web portals may be found in the text, *Internet: The Complete Reference, Millennium Edition*, Young et al. published 1999, Osbourne/McGraw-Hill, Berkeley, Calif., at pp. 394-395. It is not uncommon for Internet Service Providers to provide the user with their entry page as a Web Portal page. By their nature, Portal Web pages are likely to give the interactive user a cluttered or chaotic effect, particularly since they often rely on advertising for a portion of their revenue. Thus, it has been a Web industry goal to preserve the wide variety of links to other Web pages provided by Web Portal pages while making the portlets on such pages easier to access and more user friendly. The present invention offers an implementation toward this end.

SUMMARY OF THE INVENTION

The present invention overcomes the cluttered effect of Web Portal pages by providing an implementation for a Web Portal page interface on a computer controlled Web display station or terminal that comprises a plurality of portlet sections in said each portal page, each portlet including text and at least one active hyperlink to another Web page, means enabling a user to enter one of the displayed portlet sections, means in said Web Portal page, enabled by the entry of the user into the one portlet section, for enlarging the area of the entered one portlet section; and means in said Web Portal page, responsive to the enlarging of the area of this one portlet, for reducing the areas of a plurality of the other portlet sections wherein at least one hyperlink in each of the other portlet sections of reduced area remains active.

For best results, the means enabling the user to enter into the one portlet section is a user controlled display pointer, and the means for enlarging the area of the one portlet section automatically enlarge the area upon the entry of said pointer into the portlet section. Also, the portlet of enlarged area may have a plurality of hyperlinks increased in number from the original hyperlink content of the portlet. Also, another portlet section of reduced area originally having a plurality of hyperlinks prior may have this number reduced. In this direction, one or more of the reduced portlets may be reduced so that the whole portlet is just a hyperlink to another Web page.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
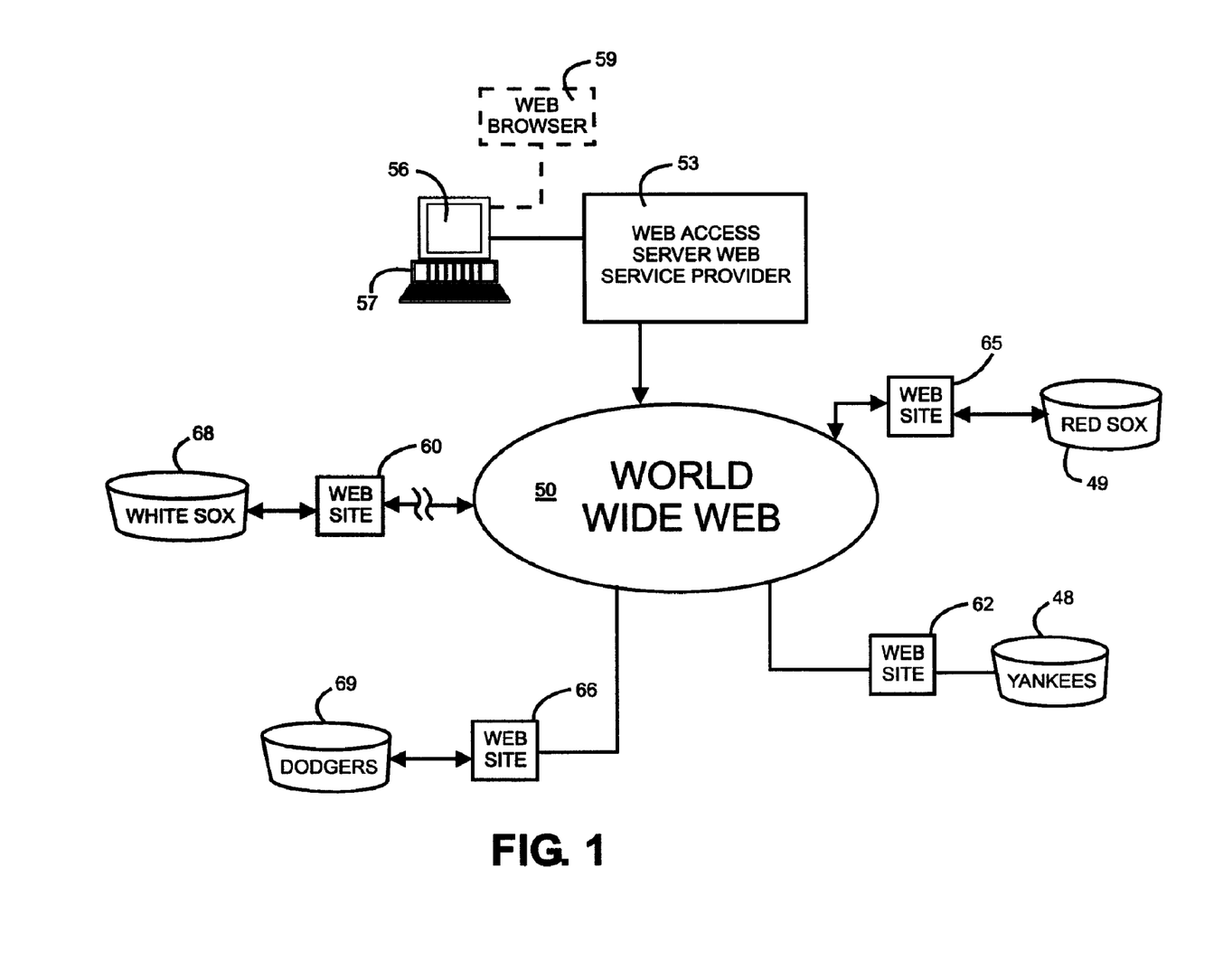
FIG. 1 is a very generalized view of a network, e.g. Web, portion showing how a Web service provider may provide Web Portal pages to users at network display stations.

Referring to FIG. 1, there is shown a very generalized diagram of a Web portion on which the present invention may be implemented. In the examples that follow, we will use the Web as the computer controlled object oriented programming network system. Actually, the present invention may be implemented on any appropriate network for handling requests from a receiving network display station for information documents from other network sites requiring logon. Receiving client or user computer stations 57, having a user interactive display interface 56, controlled by a conventional Web browser program 59, such as the Microsoft(®) Internet Explorer(®) is typically connected to the Web 50 via standard Web wired connections through Web access server 53 that may be provided by a commercial service provider. Reference may be made to the text, *Mastering the Internet*, G. H. Cady et al., published by Sybex Inc., Alameda, Calif., 1996, particularly pp. 136-147, for typical connections between receiving display stations to the Web 50 via access server 53. In the present invention, the Internet Service Provider (ISP) controlling server system 53 may develop Web Portal pages with portlets representative of Web pages and other data available from several Web sites on the Web. In the illustration of the present invention as described in the displayed Web Portal pages of FIGS. 3 through 5, the baseball information comes from the illustrative Web site 65 for accessing "Red Sox" data from database 49, Web site 62 for accessing "Yankee" data from database 48, Web site 68 for accessing "White Sox" data from database 60, and Web site 69 for accessing "Dodger" data from database 48. These are coordinated in the Web Portal page in which the individual portlets represent each of the Web sites that may be accessed through these portlets. As will be described hereinafter in greater detail, the Web Portal pages of the present invention have the capability of enlarging the area of a portlet entered (used) by the user while reducing other portlet's areas in compensation. This may be implemented through JavaScript code embedded in the Web Portal pages of this invention. The Web browser 59 associated with the receiving display terminal 57 then reads the JavaScript code to construct the initial Web Portal pages, as well as the subsequent Web Portal pages with the enlarged and reduced area portlets.

Before going further into the details of specific embodiments, it will be helpful to understand from a more general perspective the various elements and methods that may be related to the present invention. Since an aspect of the present invention is directed to Web documents, such as Web pages transmitted over networks, an understanding of networks and their operating principles would be helpful. We will not go into great detail in describing the networks to which the present invention is applicable. The Internet or Web is a global network of a heterogeneous mix of computer technologies and operating systems. Objects are linked to other objects in the hierarchy through a variety of network server computers. These network servers are the key to network distribution, such as the distribution of Web pages and related documentation. In this connection, the term "documents" is used to describe data transmitted over the Web or other networks and is intended to include Web pages with displayable text, graphics and other images.

Web documents, i.e. pages, are conventionally implemented in HTML language, which is described in detail in the text entitled *Just Java*, 2nd Edition, Peter van der Linden, Sun Microsystems, 1997, particularly at Chapter 7, pp. 249-268, dealing with the handling of Web pages; and also in the text *Mastering the Internet*, G. H. Cady et al., published by Sybex Inc., Alameda, Calif., 1996, particularly at pp. 637-642, on HTML in the formation of Web pages. The Web Portal pages of this invention are a particular form of Web page. A generalized description of Web Portals may be found in the above-mentioned text, *Internet: The Complete Reference, Millennium Edition*, particularly at pp. 394-395. It is not uncommon for ISPs to provide the user with their entry or Web Portal page.

In addition, aspects of this invention will involve Web browsers. A general and comprehensive description of browsers may be found in the above-mentioned *Mastering the Internet* text at pp. 291-313. More detailed browser descriptions may be found in the *Internet: The Complete Reference, Millennium Edition* text mentioned above: Chapter 19, pp. 419-454, on the Netscape Navigator; Chapter 20, pp. 455-494, on the Microsoft Internet Explorer; and Chapter 21, pp. 495-512, covering Lynx, Opera and other browsers.

Figure 2:
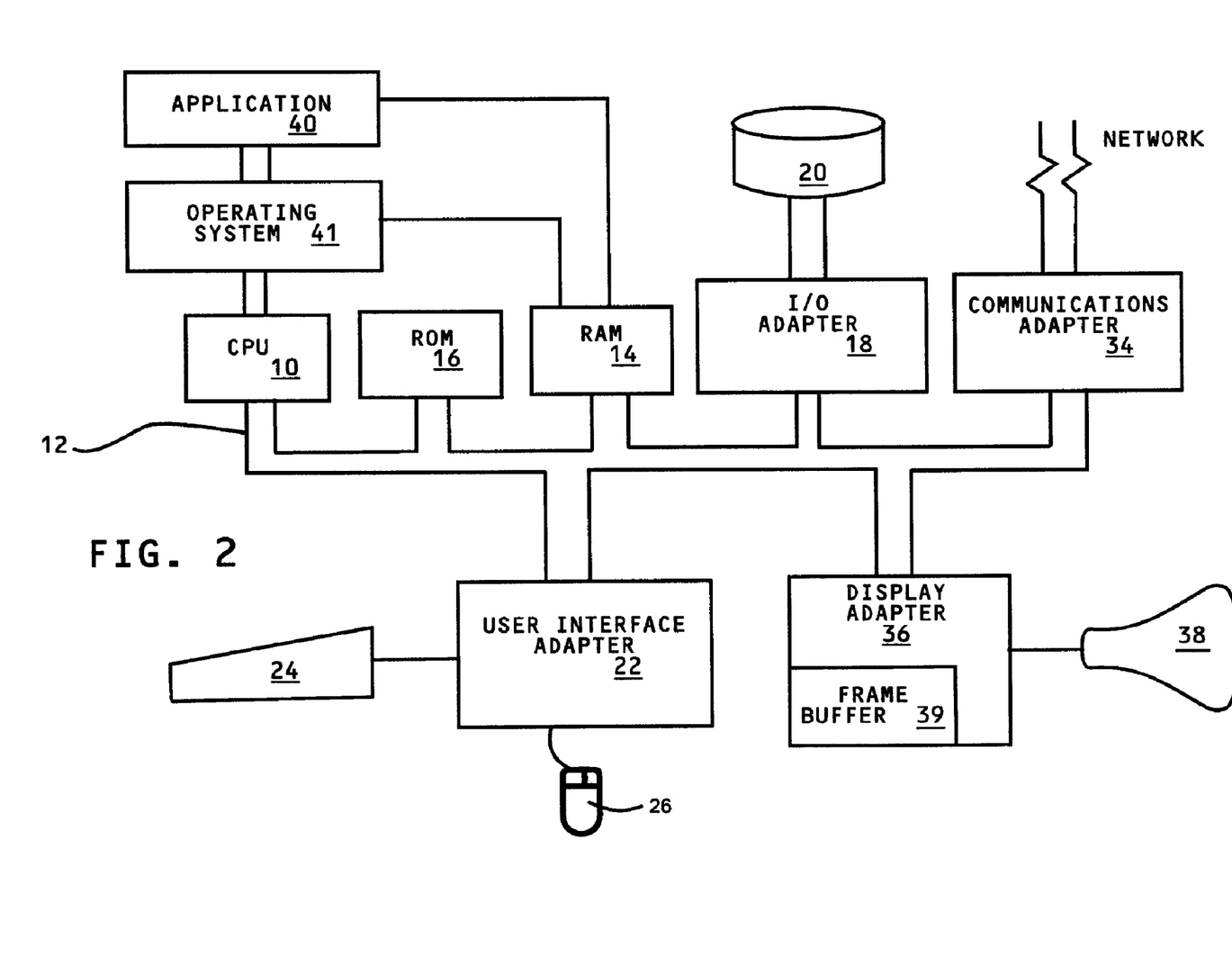
FIG. 2 is a block diagram of a data processing system including a central processing unit and network connections via a communications adapter that is capable of functioning as users' computer controlled display stations on which the Web Portal page interface of the present invention may be interactively accessed.

Referring to FIG. 2, a typical data processing unit is shown that may function as the receiving display station 57 for receiving the Web documents, such as Web Portal pages, from Web sites via Web service providers for displaying such Web Portal pages. A central processing unit (CPU) 10, such as one of the PC microprocessors or workstations, e.g. eServer pSeries available from International Business Machines Corporation (IBM) or Dell PC microprocessors, is provided and interconnected to various other components by system bus 12. An operating system 41 runs on CPU 10, provides control and is used to coordinate the function of the various components of the computer of FIG. 2. Operating system 41 may be one of the commercially available operating systems, such as IBM's AIX or Microsoft's WindowsMe™ or Windows 2000™, as well as UNIX and other IBM AIX operating systems. Application programs 40, controlled by the system, are moved into and out of the main memory Random Access Memory (RAM) 14. These programs include Web browser programs of the present invention that are responsive to the JavaScript code instructions embedded in the HTML forming the Web Portal pages of the present invention that expand portlet areas during user functions within such portlets and perform complementary reductions in the areas of portlets not performing user functions. These functions will be described hereinafter in combination with conventional Web browsers (browsers 49, FIG. 1) that have the capability of interpreting and executing the JavaScript code at the receiving display terminals, such as Microsoft's Internet Explorer™. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside network. In the case of server 45, this could be the Web. I/O devices are also connected to system bus 12 via user interface adapter 22 and display adapter 36. Keyboard 24 and mouse 26 are all interconnected to bus 12 through user interface adapter 22. It is through such input devices that the user at the receiving terminal computers may interactively relate to the Web Portal pages with embedded code for implementing the Web page portlet resizing in accordance with the present invention.

Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 3:
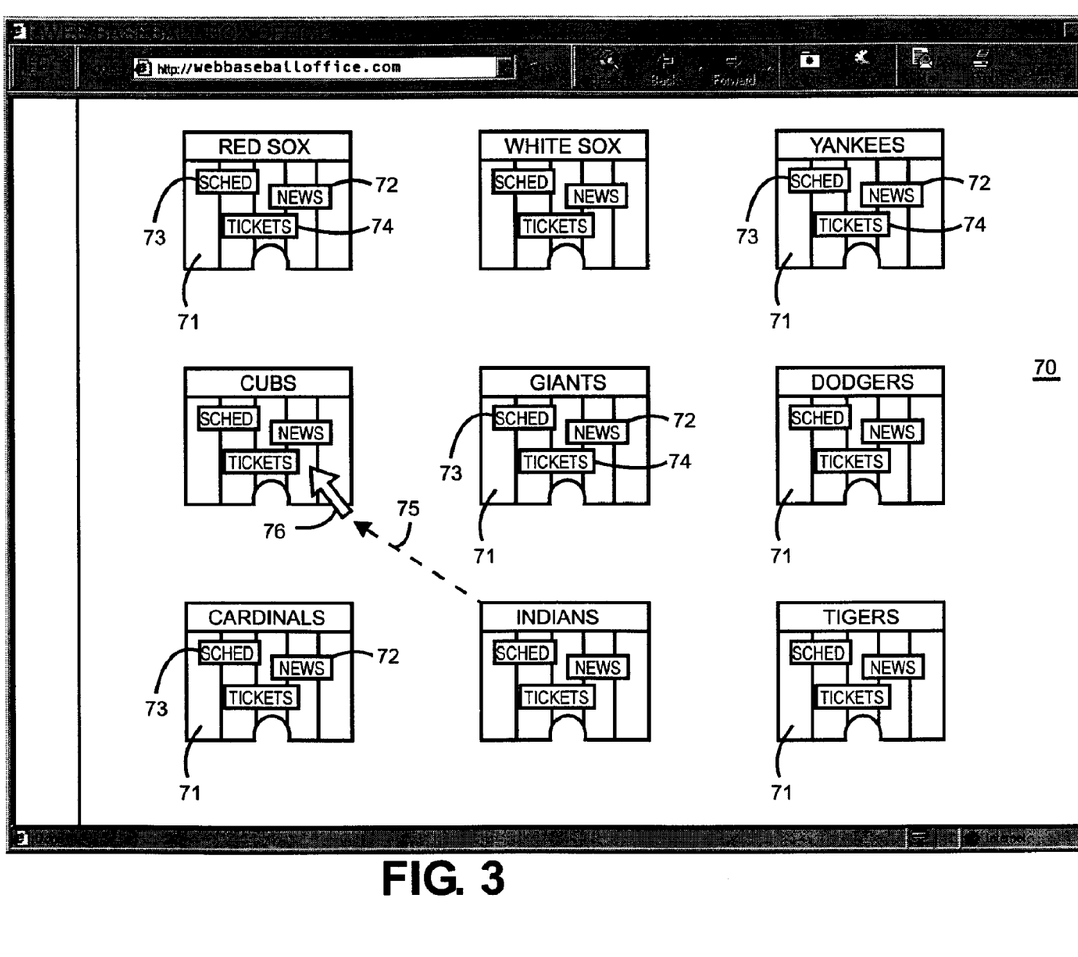
FIG. 3 is a diagrammatic view of a display screen on a computer station illustrating an initial generalized Web Portal page.
Figure 4:
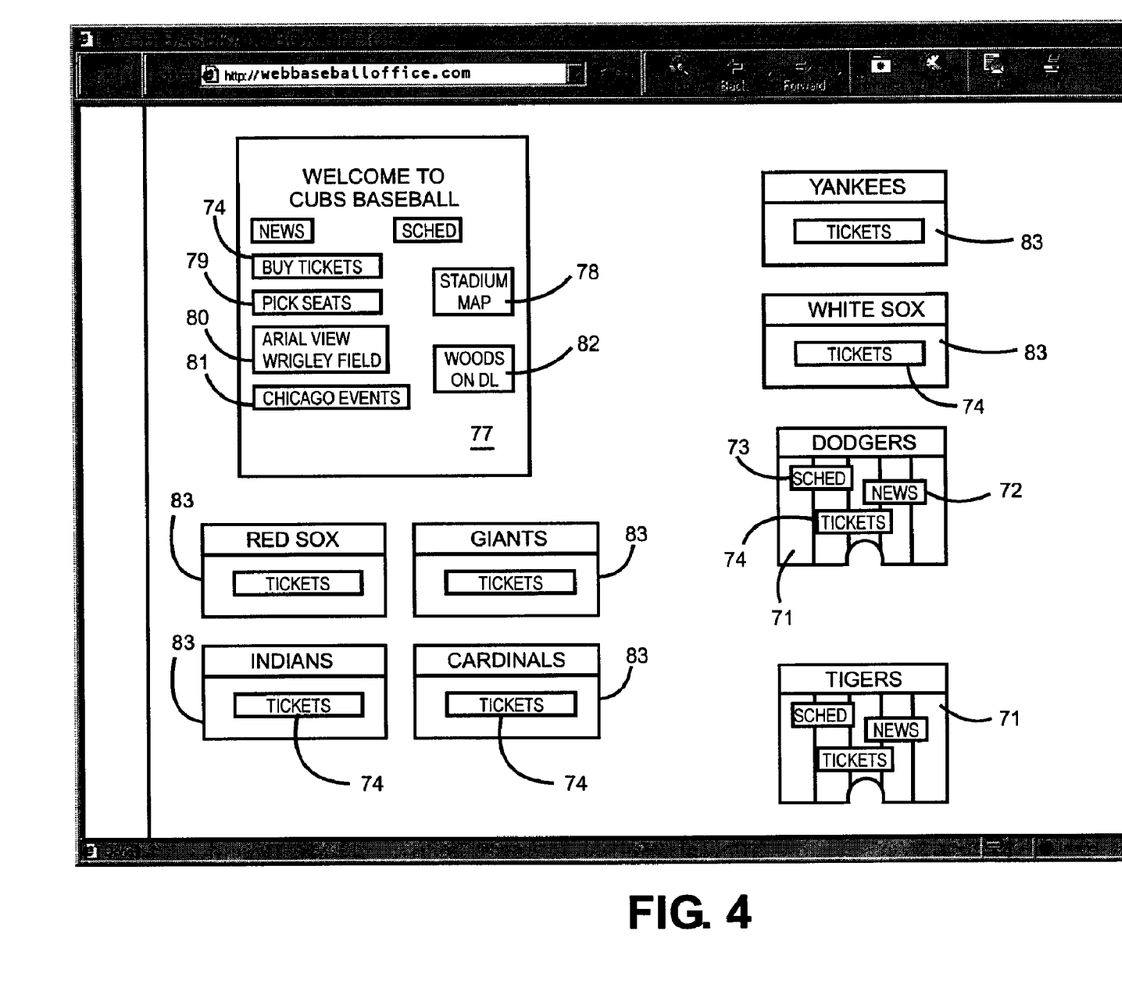
FIG. 4 is the display screen view of FIG. 3 but after the user has entered one of the portlets in the Web Portal page.
Figure 5:
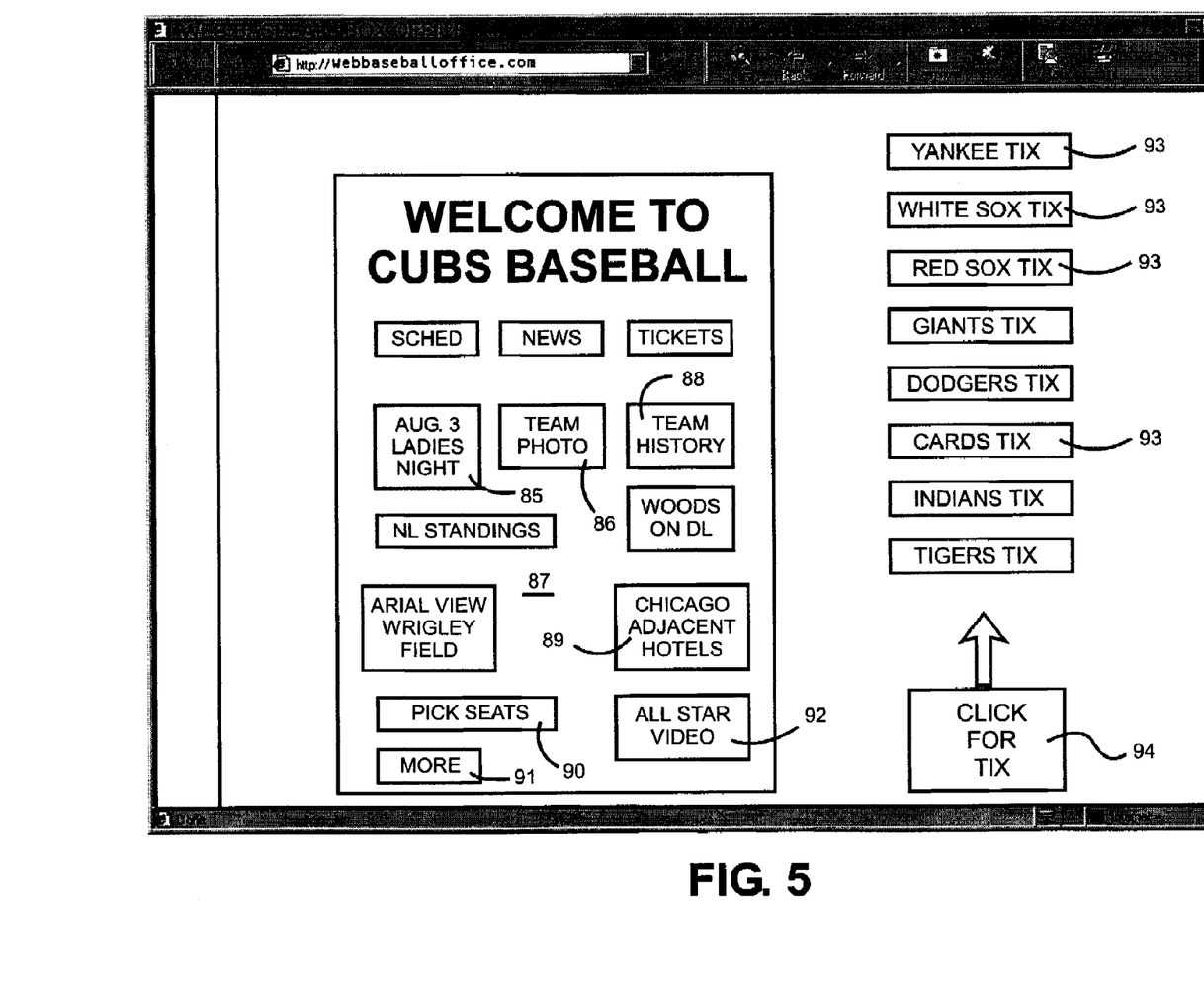
FIG. 5 is another variation of the display screen view of FIG. 4.

With reference to FIGS. 3 through 5, the general operation of the present invention will be described with respect to Web Portal page interface on display screen 70, FIG. 3. The Web Portal page shown ("Web Baseball Box Office") is an illustrative Web Portal page offering to users schedules, ticket purchasing and other information related to nine Major League baseball teams. The individual portlets 71 are of the same size and uniformly spacially arranged. They have a box office window format with each having a hyperlink for schedule 73, news 72 and ticket purchase 71. In the illustration, the user is interested in the "Cubs" window and has moved 75 his cursor or pointer 76 into the "Cubs" window or portlet. At this point, in response to the movement of the pointer into the window, as shown in FIG. 4, the entered portlet has automatically expanded in size to portlet 77 with a different format and with several additional hyperlinks: "Pick Seats" 79, "Stadium Map" 78, "Field View" 80, "Chicago Events" 81 and a news item 82. Some of the other portlets 83 have been reduced in size to compensate for the increased area of portlet 77, but they still retain at least one hyperlink 74 to tickets. In another variation illustrated in FIG. 5, the portlet 87 to "Cubs" information is of an even greater size, and has even more hyperlinks 85, 86, 88 and 90, 91 and 92 to other Web pages. In FIG. 5, all of the other portlets 93 have each been reduced to a single hyperlink that the user is prompted 94 if the user needs tickets for any of the respective other eight teams.

JavaScript is a conventional simple interpreted scripting language that enables Web page developers to embed simple Java-like programming instructions within the HTML text of Web pages. For further information with respect to the use of JavaScript within HTML text in Web pages, reference is made to the description in the text, *Dynamic HTML in Action*, Michele Petrovsky, published by Osborne, McGraw-Hill, Berkeley, Calif., 1998, particularly at pp. 150-158 and 184-185. It is understood that many functions may be added to HTML coding supporting Web pages. The JavaScript code embedded in the HTML structure of the Web Portal page shown in FIG. 3 is set up so that the entry of the cursor 76 into a portlet as shown in FIG. 3 automatically triggers the code to generate either a Web Portal page as shown in FIG. 4 or a Web Portal page as shown in FIG. 5.

Figure 6:
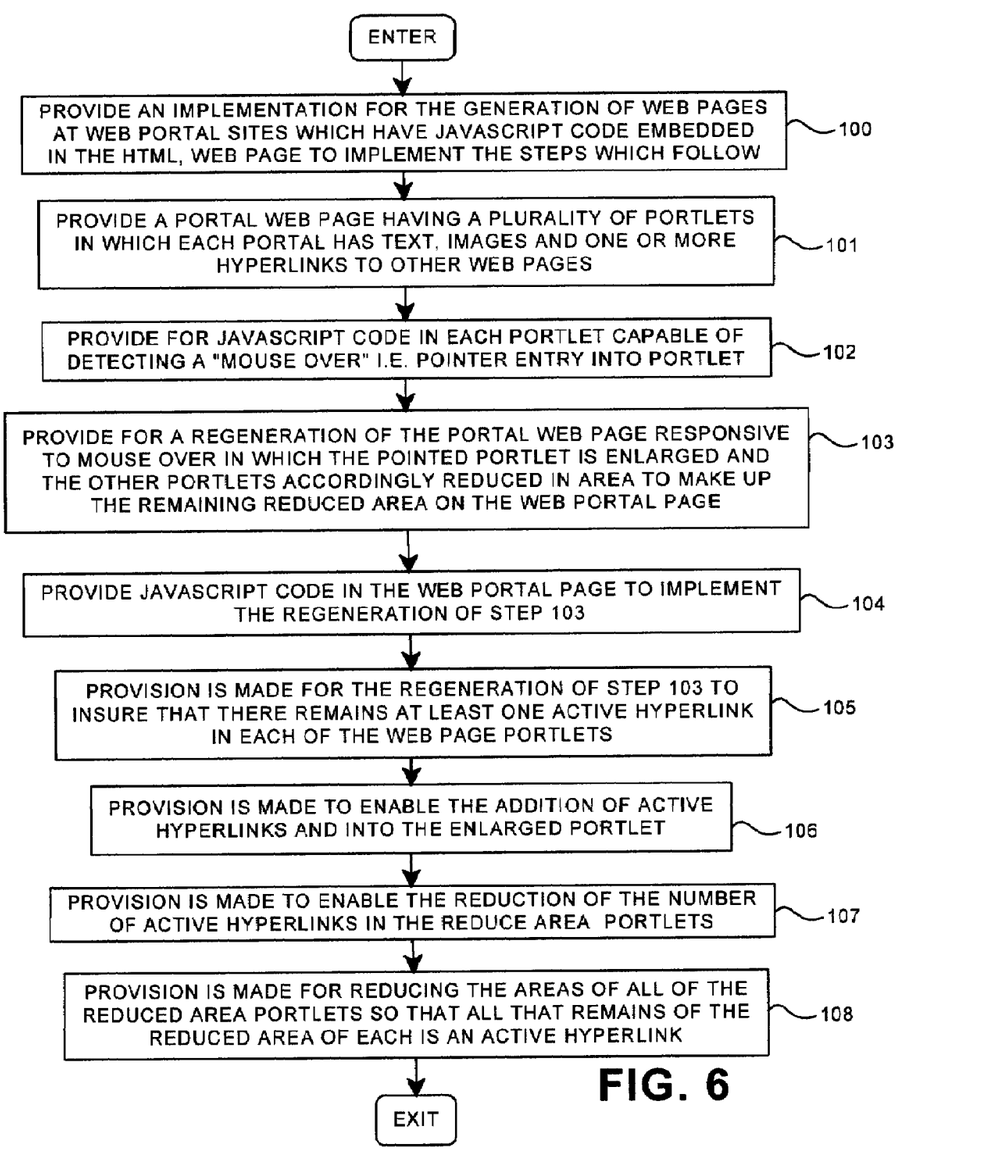
FIG. 6 is an illustrative flowchart describing the setting up of the process of the present invention for maximizing the accessibility of the currently entered portlet.

FIG. 6 is a flowchart showing the development of a process according to the present invention for providing users at computer controlled displays with Web Portal pages, the portlets of which are directly expandable in response to the entry of a user and the remaining portlets temporarily reduced in size to meet display space limitations. There is provided an implementation for the generation of Web pages at Web Portal sites that have JavaScript code embedded in the HTML code describing the Web Portal page, step 100. In the current illustration, the Web service provider organizes and transmits the Web Portal page to the requesting user display terminal. The Web Portal page has a plurality of portlets in which each portlet has text, images and one or more hyperlinks to other Web pages, step 101. Provision is made for JavaScript code in the Web Portal page providing for the detection of a "mouse over" or pointer entry into a portlet, step 102. Provision is made for the regeneration of the Web Portal page responsive to a mouse over in which the pointed to portlet is enlarged, and at least some of the other portlets accordingly reduced in area to make up the remaining reduced area on the Web Portal page, step 103. Provision is made, step 104, for inclusion of JavaScript code in the HTML content of the Web Portal page to implement the regeneration of step 103. Provision is made to ensure that during the regeneration of step 103, there still remains at least one active hyperlink in each of the Web page portlets, step 105. There is further provision for the addition of active hyperlinks in any enlarged portlet, step 106. Provision is made to enable the reduction of the number of hyperlinks in any of the reduced area portlets, step 107. Provision is made for the optional regeneration of the Web Portal page to reduce the areas of all of the portlets other than the enlarged area portlet so that all that remains of the reduced area of each is a single active hyperlink, step 108.

Figure 7:
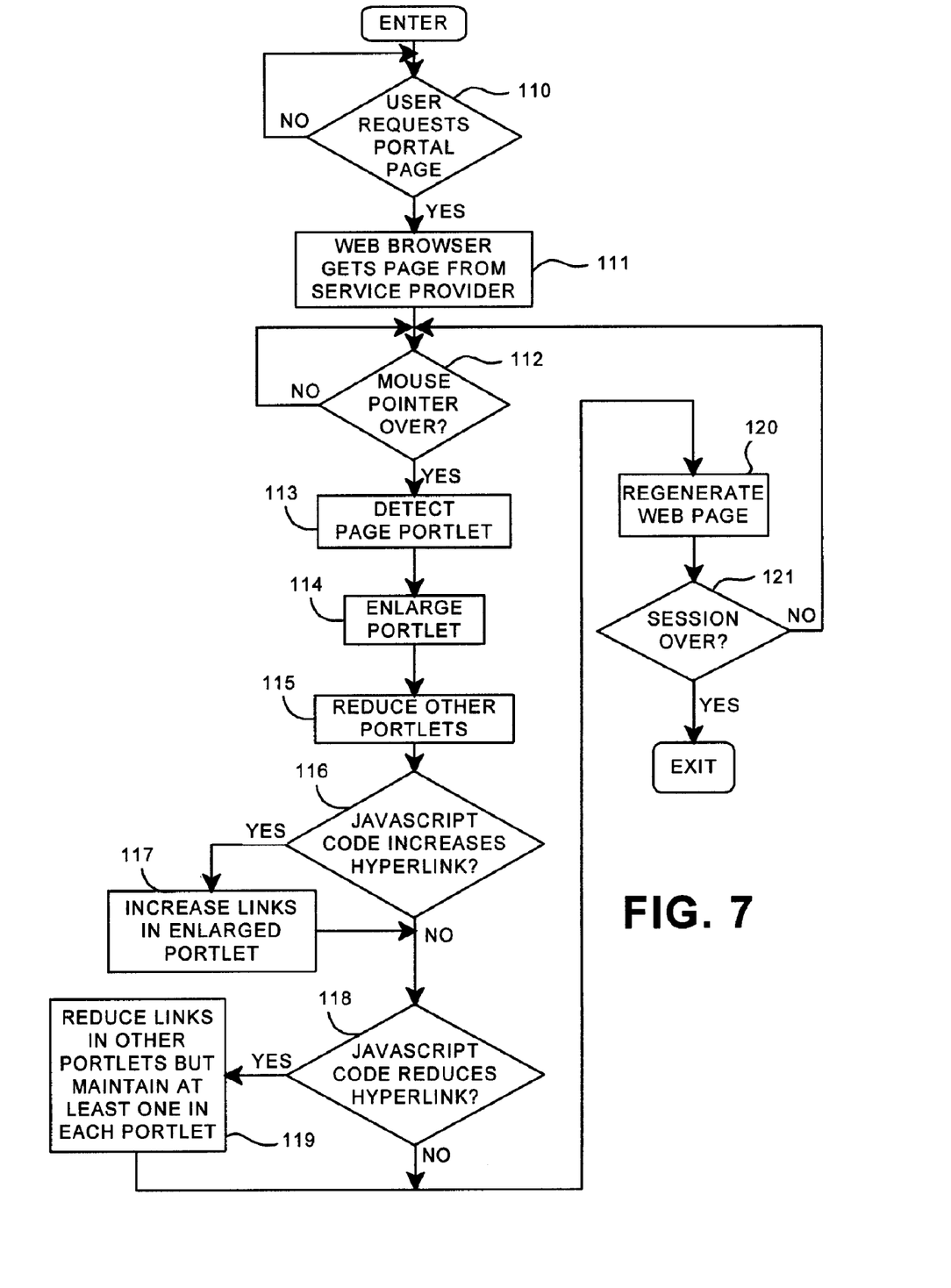
FIG. 7 is a flowchart of an illustrative run of the process setup in FIG. 6.

The running of the process set up in FIG. 6 will now be described with respect to the flowchart of FIG. 7. The user opens a Web session via the Web browser. An initial determination is made as to whether the user requests a Web Portal page, step 110. If Yes, the Web browser gets the Web Portal page from the ISP, step 111. Now that the Web Portal page is displayed and interactively addressed by a user, a determination is made, step 112, as to whether the mouse pointer has entered any portlet on the Web Portal page. If Yes, then the entered portlet is detected, step 113. The entered portlet is then enlarged, step 114, and several of the other portlets are reduced, step 115. Then a determination is made as to whether the embedded JavaScript, step 116, calls for the increase in the number of hyperlinks in the enlarged portlet. If Yes, then, step 117, the number of hyperlinks is accordingly increased. Then, or if No, a further determination is made as to whether the code calls for a reduction in the number of hyperlinks in portlets having reduced area, step 118. If Yes, then the number of hyperlinks is reduced accordingly but at least one hyperlink in each portlet is maintained, step 119. At this point, step 120, the resulting Web Portal page is regenerated and displayed to the user. Now, a determination may conveniently be made as to whether the session is over, step 121. If Yes, the session is exited. If No, the session is branched back to step 112.

One of the implementations of the present invention is in application program 40, i.e. a browser program made up of programming steps or instructions resident in RAM 14, FIG. 2, of a client display station and/or server during various operations. Until required by the computer system, the program instructions may be stored in another readable medium, e.g. in disk drive 20 or in a removable memory, such as an optical disk for use in a CD ROM computer input or in a floppy disk for use in a floppy disk drive computer input. Further, the program instructions may be stored in the memory of another computer prior to use in the system of the present invention and transmitted over a network, such as the Web itself, when required by the user of the present invention.

One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:
1. In a World Wide Web communication network with user access via a plurality of data processor controlled interactive receiving display stations, a method for providing Web portal pages comprising:
transmitting a Web portal page from a Web portal site to a receiving display station;
displaying, at said receiving display station, said Web portal page including a plurality of portlet sections in said displayed page, each portlet section having an original area including text and at least one displayed active hyperlink to another Web page;

enabling a user to enter one of said displayed portlet sections by moving a display pointer into said one portlet section;

enabling, by the entry of said user into said one portlet section, the enlargement of the area of said one portlet section to a size greater than said original area; and responsive to said enlarging of the area of said one portlet, reducing the areas of each of a plurality of the other portal sections to a size smaller than said original area, wherein said at least one displayed active hyperlink in each of the other portlet sections of reduced area remains active.

2. The method of claim 1 wherein:

said enlarging the area of said one portlet section automatically enlarges said area upon the entry of said pointer into said one portlet section.

3. The method of claim 1 further including the step of increasing the number of hyperlinks in said portlet section having said enlarged area.

4. The method of claim 3 wherein the hyperlinks in another portlet section of reduced area are reduced in number.

5. The method of claim 4 wherein said whole other portlet section area is reduced to a displayed single active hyperlink.

6. An interactive display interface on a computer controlled display system for providing Web portal pages, the system comprising:

a processor;

a computer memory holding computer program instructions which when executed by the processor perform the method comprising:

displaying, at said display interface, a Web portal page including a plurality of portlet sections in said displayed page, each portlet section having an original area including text and at least one displayed active hyperlink to another Web page;

enabling a user to enter one of said displayed portlet sections by moving a display pointer into said one portlet section;

enabling, by the entry of said user into said one portlet section, the enlargement of the area of said one portlet section to a size greater than said original area; and responsive to said enlarging of the area of said one portlet, reducing the areas of each of a plurality of the other portal sections to a size smaller than said original area, wherein said at least one displayed active hyperlink in each of the other portlet sections of reduced area remains active.

7. The display interface of claim 6 wherein:

said performed method enlarges the area of said one portlet section automatically upon the entry of said pointer into said one portlet section.

8. The display interface of claim 6, wherein the performed method further includes increasing the number of hyperlinks in said portlet section having said enlarged area.

9. The display interface of claim 8, wherein the hyperlinks in another portlet section of reduced area are reduced in number.

10. The display interface of claim 9 wherein said whole other portlet section area is reduced to a displayed single active hyperlink.

11. A system for providing Web Portal pages In a World Wide Web communication network with user access via a plurality of data processor controlled interactive receiving display stations, the system comprising:

a processor;

a computer memory holding computer program instructions which when executed by the processor perform the method comprising:

displaying, at a receiving display station, a Web portal page including a plurality of portlet sections in said displayed page, each portlet section having an original area including text and at least one displayed active hyperlink to another Web page;

enabling a user to enter one of said displayed portlet sections by moving a display pointer into said one portlet section;

enabling, by the entry of said user into said one portlet section, the enlargement of the area of said one portlet section to a size greater than said original area; and responsive to said enlarging of the area of said one portlet, reducing the areas of each of a plurality of the other portal sections to a size smaller than said original area, wherein said at least one displayed active hyperlink in each of the other portlet sections of reduced area remains active.

12. The system of claim 11 wherein:

said performed method enlarges the area of said one portlet section automatically upon the entry of said pointer into said one portlet section.

13. The system of claim 11 wherein the performed method further includes increasing the number of hyperlinks in said portlet section having said enlarged area.

14. The system of claim 13 wherein the hyperlinks in another portlet section of reduced area are reduced in number.

15. The system of claim 14 wherein said whole other portlet section area is reduced to a displayed single active hyperlink.

16. A computer usable storage medium having stored thereon a computer readable program for providing Web Portal pages In a World Wide Web communication network with user access via a plurality of data processor controlled interactive receiving display stations, wherein the computer readable program when executed on a computer causes the computer to:

transmitting a Web portal page from a Web portal site to a receiving display station;

displaying, at said receiving display station, said Web portal page including a plurality of portlet sections in said displayed page, each portlet section having an original area including text and at least one displayed active hyperlink to another Web page;

enabling a user to enter one of said displayed portlet sections by moving a display pointer into said one portlet section;

enabling, by the entry of said user into said one portlet section, the enlargement of the area of said one portlet section to a size greater than said original area; and responsive to said enlarging of the area of said one portlet, reducing the areas of each of a plurality of the other portal sections to a size smaller than said original area, wherein said at least one displayed active hyperlink in each of the other portlet sections of reduced area remains active.

17. The computer usable storage medium of claim 16, wherein the computer program when executed on a computer:

enlarges the area of said one portlet section automatically upon the entry of said pointer into said one portlet section.

18. The computer usable storage medium of claim 17, wherein said computer program further increases the number of hyperlinks in said portlet section having said enlarged area.

19. The computer usable storage medium of claim 18 wherein the hyperlinks in another portlet section of reduced area are reduced in number.

20. The computer usable storage medium of claim 19 wherein said whole other portlet section area is reduced to a displayed single active hyperlink.

* * * * *